Figure 4:
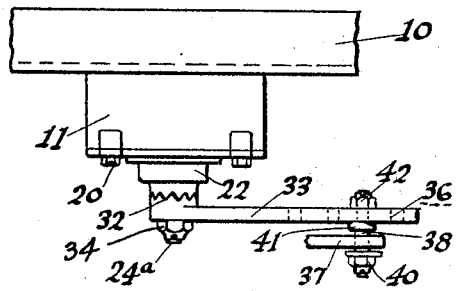

March 16, 1926.
H. A. ADAMS
1,576,801
COMBINED SHOCK ABSORBER AND SNUBBER
Filed June 9, 1924     3 Sheets-Sheet 1
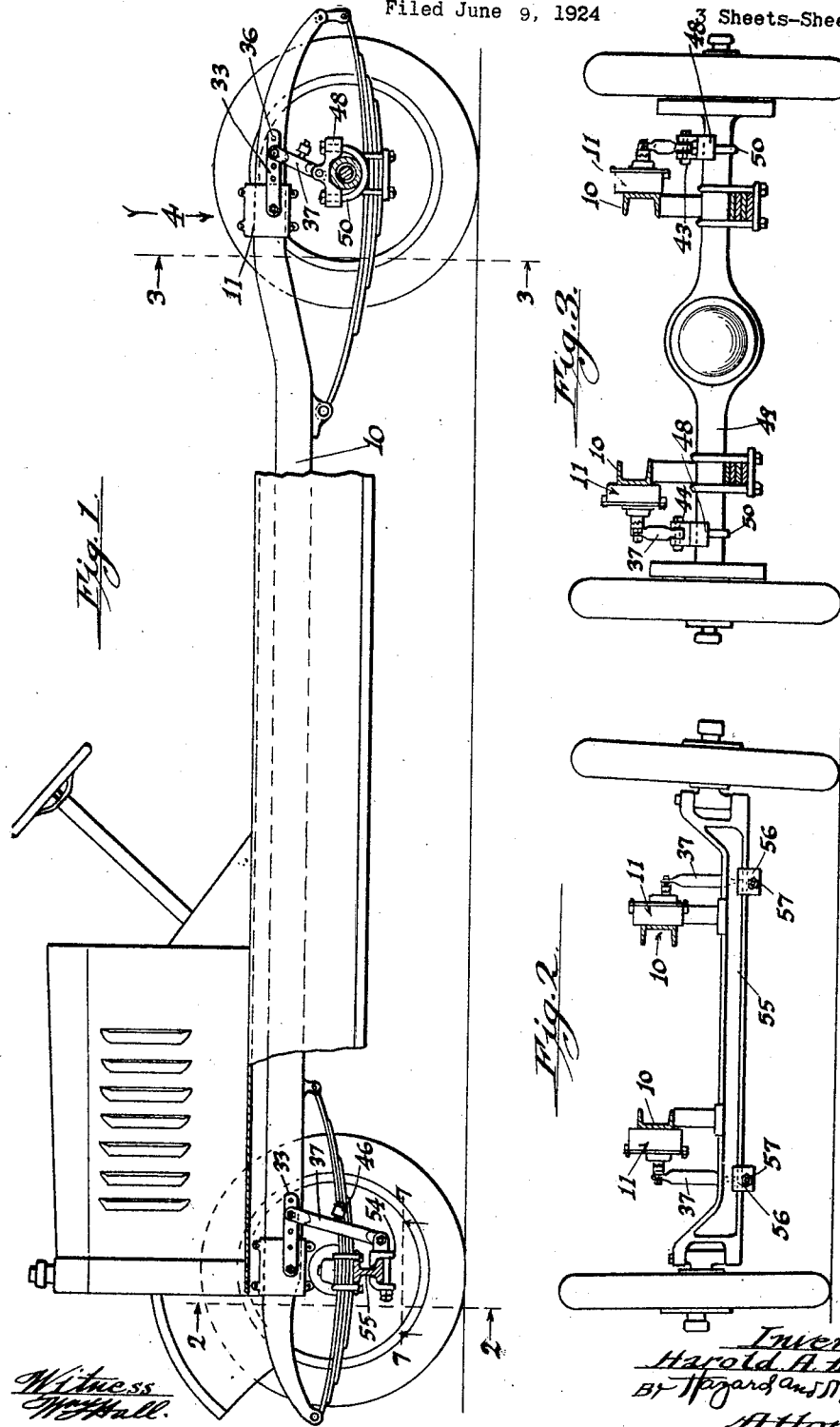

March 16, 1926.

H. A. ADAMS 1,576,801

COMBINED SHOCK ABSORBER AND SNUBBER

Filed June 9, 1924  3 Sheets-Sheet 2

Inventor.
Harold A. Adams
By Hazard and Miller
Attorneys.

Witness:
Wm. J. Hall.

March 16, 1926.
H. A. ADAMS
1,576,801
COMBINED SHOCK ABSORBER AND SNUBBER
Filed June 9, 1924   3 Sheets-Sheet 3
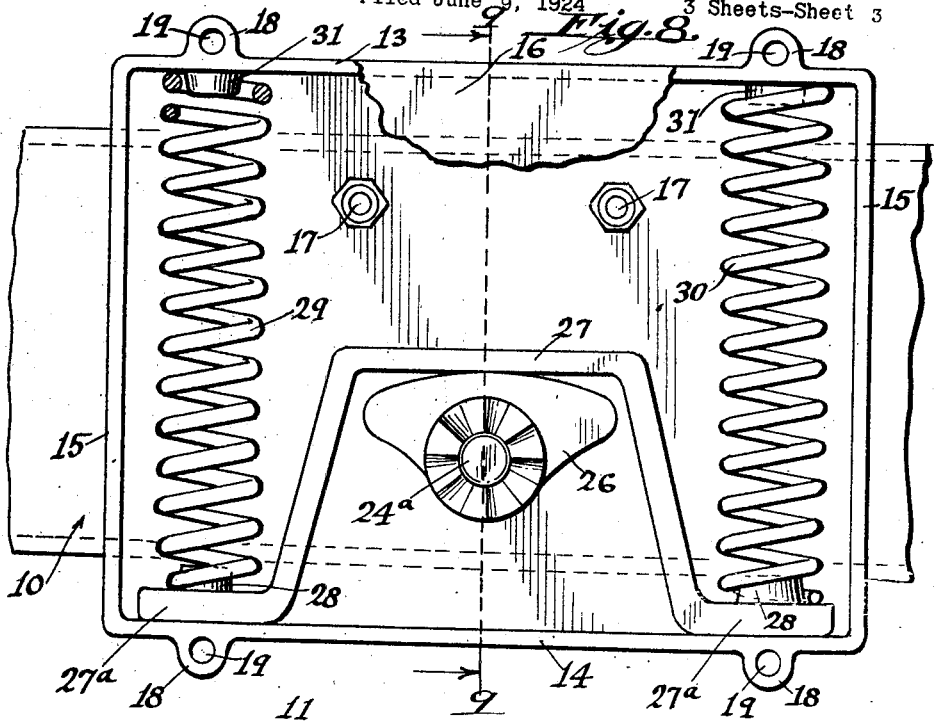
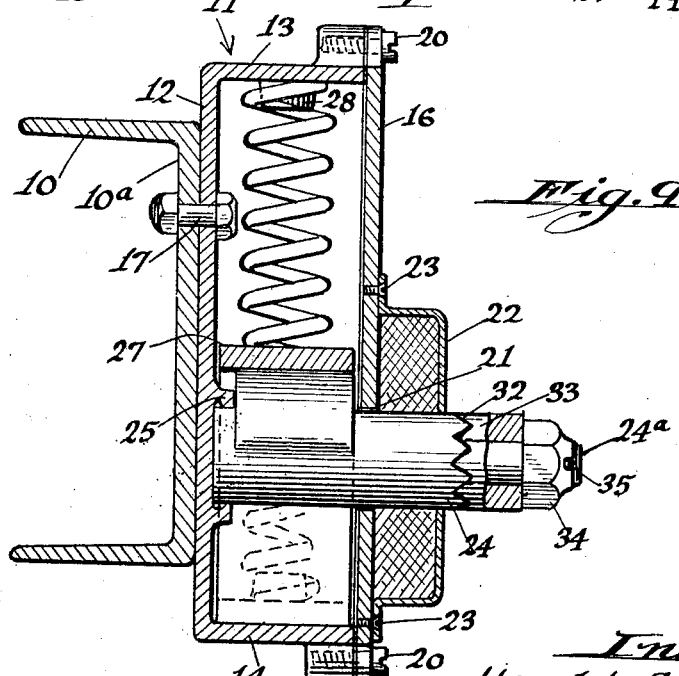
Inventor:
Harold A. Adams
By Hazard and Miller
Attorneys.
Witness:
W. T. Hall.

Patented Mar. 16, 1926.

1,576,801

UNITED STATES PATENT OFFICE.

HAROLD A. ADAMS, OF EAST BAKERSFIELD, CALIFORNIA, ASSIGNOR OF ONE-FOURTH TO JOHN NELSON AND ONE-FOURTH TO C. R. DOUGHERTY, BOTH OF BAKERSFIELD, CALIFORNIA, AND ONE-FOURTH TO O. R. DUNBAR, OF LONG BEACH, CALIFORNIA.

COMBINED SHOCK ABSORBER AND SNUBBER.

Application filed June 9, 1924. Serial No. 718,791.

*To all whom it may concern:*

Be it known that I, HAROLD A. ADAMS, a citizen of the United States, residing at East Bakersfield, in the county of Kern and State of California, have invented new and useful Improvements in Combined Shock Absorbers and Snubbers, of which the following is a specification.

This invention relates to a combined shock absorber and snubber for vehicles.

Figure 5:
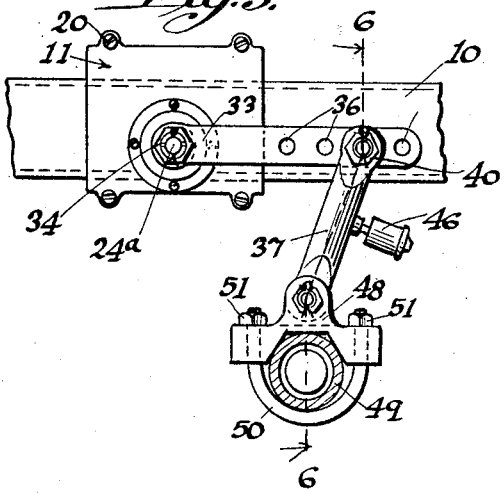
Figure 6:
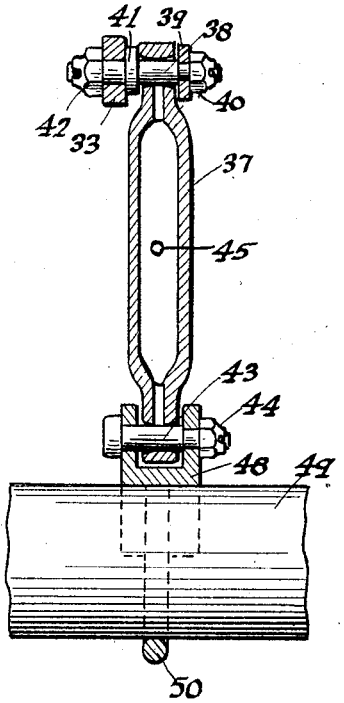
Figure 7:
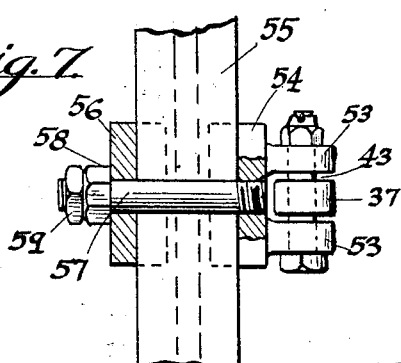

The invention is illustrated in the drawings, in which:

Figure 1 is a side elevation of an automobile in part, showing the devices of my invention secured to the frame and to the front and rear axles, Fig. 2 is an end view taken on the line 2—2 of Fig. 1, and showing two devices of my invention as applied to the front axle, Fig. 3 is a view taken on the line 3—3 of Fig. 1, and showing two devices of my invention applied to the rear axle, Fig. 4 is a plan view of the devices, as attached to the rear axle of the automobile, Fig. 5 is an elevational view of the devices as attached to the rear axle of the automobile, Fig. 6 is a section taken on the broken line 6—6 of Fig. 5, Fig. 7 is a view taken on the line 7—7 of Fig. 1, Fig. 8 is an elevational view of the principal part of the device with the cover removed, and Fig. 9 is a vertical section taken on the line 9—9 of Fig. 8.

Referring to the drawings for a more detailed description thereof, the numeral 10 indicates channel irons which form the sides of the automobile frame, and to the web of each of which are secured at a forward and rear position combined snubbers and shock absorbers. The device of my invention comprises a casing or box 11, having a back 12, a top 13, a bottom 14, ends 15 and a removable cover 16. The casing is secured to the frame 10 by means of bolts 17 passing through the back 12 of the casing and through a web 10ª of the frame. The top 13 and the bottom 14 are provided with lugs 18 having threaded apertures 19 which receive screws 20 passing through the removable cover 16 which is provided with an aperture 21.

A stuffing box 22 is removably secured by means of screws 23 to the cover 16 of the casing. The stuffing box 22 is provided for the purpose of preventing the expression of grease or oil, which the casing 11 preferably contains. An oscillatable cam shaft 24 passes through the stuffing box and through the aperture 21 of the cover 16 to the back 12 of the casing 11, the back 12 being formed to provide a bearing 25 for the shaft 24.

A fan-shaped cam 26 is formed on the upper side of the rod 24 and contacts with a member 27 which is bent downwardly on either side of the cam 26 and comprises horizontal portions or feet 27ª, on the upper surfaces of which are formed projections 28 which engage coiled compression springs 29 and 30 respectively. The upper ends of the coiled springs 29 and 30 are engaged by projections 31 depending from the top 13 of the casing 11. The compression springs 29 and 30 normally keep the member 27 in contact with the cam 26 and keep the feet 27ª in contact with the bottom 14 of the casing 11.

The shaft 24 is provided with teeth 32 which engage corresponding recesses formed in a crank 33 which is carried on a reduced end extension 24ª of the shaft 24, and is secured to the extension 24ª by a nut 34 which is locked on the extension 24ª by a pin 35. The crank 33 extends at right angles to the shaft 24 and is provided with apertures 36.

A link 37 is secured to the crank 33 by a crank pin or bolt 38 which passes through the upper end of the link and through any desired one of the apertures 36 of the crank. A washer 39 is placed on the crank pin 38 and abuts against the outer surface of the link 37. A nut 40 threadedly engages the crank pin 38 and is tightened against the washer 39. A washer 41 is placed on the crank pin 38 between its inner surface and the crank 33. A nut 42 threadedly engages the inner end of the crank pin 38 and is tightened against the crank 33. A bolt 43 passes through the lower end of the link 37 and is threadedly engaged by a nut 44. The link 37 is enlarged between its ends and is hollow between the crank pin 38 and bolt 43, and is thus formed to receive a lubricant, there being an aperture 45 through which the lubricant may pass into the link 37 from a grease cup 46.

In securing the lower end of the link 37 to the rear axle, the bolt 43 passes through a member 48 which rests on the housing 49 of the rear axle and is secured to the housing by an arcuate member or strap 50, the ends of which pass through the member 48 and are secured thereto by nuts 51.

In securing the link 37 to front axle, the bolt 43 passes through spaced lugs 53 formed on an angle iron 54, one side of which rests on a flange of the front axle 55. Another angle iron 56 rests on an opposing flange of the axle 55 and a bolt 57 passes immediately under the axle 55 and through the angle irons 56 and 54, the bolt 57 threadedly engaging the latter angle iron. A nut 58 engages the bolt 57 and a lock nut 59 is provided to lock the nut 58. The link 37, when connected to a front axle, is longer than when connected to a rear axle.

In the operation of the device, the crank 33 will be moved upwardly when the automobile strikes an elevated point in the road. This movement of the crank 33 will rotate the shaft 24 and thereby rock the cam 26, which then lifts the member 27 against the action of one of the coiled compression springs which absorbs the shock. In the re-action from the shock, the cam 26 is rocked in the other direction, and the other one of the coiled compression springs then acts as a snubber to check the re-action.

This invention has been described but modifications thereof may be devised without departing from the spirit thereof, and it is to be understood that such modifications come within the scope of this invention.

What is claimed is:

1. A combined shock absorber and snubber comprising a housing adapted to be mounted upon the frame of a vehicle, a cam shaft having a cam thereon rotatable in said housing, a movable member disposed within said housing and extending across said cam shaft adjacent said cam, compression springs disposed within said housing and engaging said movable member upon opposite sides of said cam shaft, a crank rigid with said cam shaft, and means connecting said crank to an axle of the vehicle whereby any relative movement between the axle and the frame will produce rotation of said cam shaft and cause said cam to move said movable member against said springs.

2. A combined shock absorber and snubber comprising a housing adapted to be mounted upon the frame of a vehicle, a cam shaft having a cam thereon rotatable in said housing, a movable member disposed within said housing and extending across said cam shaft adjacent said cam, compression springs disposed within said housing and engaging said movable member upon opposite sides of said cam shaft, a crank rigid with said cam shaft, means connecting said crank to an axle of the vehicle whereby any relative movement between the axle and the frame will produce rotation of said cam shaft and cause said cam to move said movable member against said springs, and a stuffing box mounted upon said housing about said cam shaft.

3. A combined shock absorber and snubber comprising a housing adapted to be secured to the frame of a vehicle, a cam shaft carrying a cam rotatable within said housing, a movable member disposed within said housing across the cam shaft, said movable member having portions extending downwardly to provide feet adapted to engage the bottom of the housing, springs compressed between said feet and the top of the housing, a crank secured to said cam shaft, and a link pivotally connected to said crank and to said axle whereby relative movement between the axle and the frame will produce rotation of the cam shaft and cause the cam to lift the movable member against said springs.

4. A combined shock absorber and snubber comprising a housing adapted to be mounted upon the frame of a vehicle, a cam shaft having a cam thereon rotatable within the housing, a movable member disposed within the housing extending across the cam shaft against the cam, springs engaging the ends of the movable member upon opposite sides of the cam shaft for urging it against the cam, a crank secured to said cam shaft, and means connecting the crank to an axle of the vehicle whereby relative movement between the axle and the frame will produce rotation of the cam shaft and move said movable member against the action of said springs.

5. A combined shock absorber and snubber comprising a housing adapted to be mounted upon the frame of a vehicle, a cam shaft having a cam thereon rotatable within the housing, a movable member disposed within the housing extending across the cam shaft against the cam, springs engaging the ends of the movable member upon opposite sides of the cam shaft for urging it against the cam, means providing teeth upon the end of the cam shaft, a crank adapted to be positioned on the cam shaft having teeth adapted to interfit therewith, a nut for tightening the crank against the teeth on the cam shaft permitting adjustment of the crank relatively to the cam shaft but holding it rigidly secured thereto, and means connecting the crank to an axle of the vehicle whereby relative movement between the axle and frame will cause the cam shaft to rotate and move said movable member against the action of said springs.

In testimony whereof I have signed my name to this specification.

HAROLD A. ADAMS.